May 2, 1933. W. C. ANTHONY 1,906,302
DUMPING BODY
Filed March 17, 1931 3 Sheets-Sheet 1

Inventor
William C. Anthony
by Parker & Carter
Attorneys.

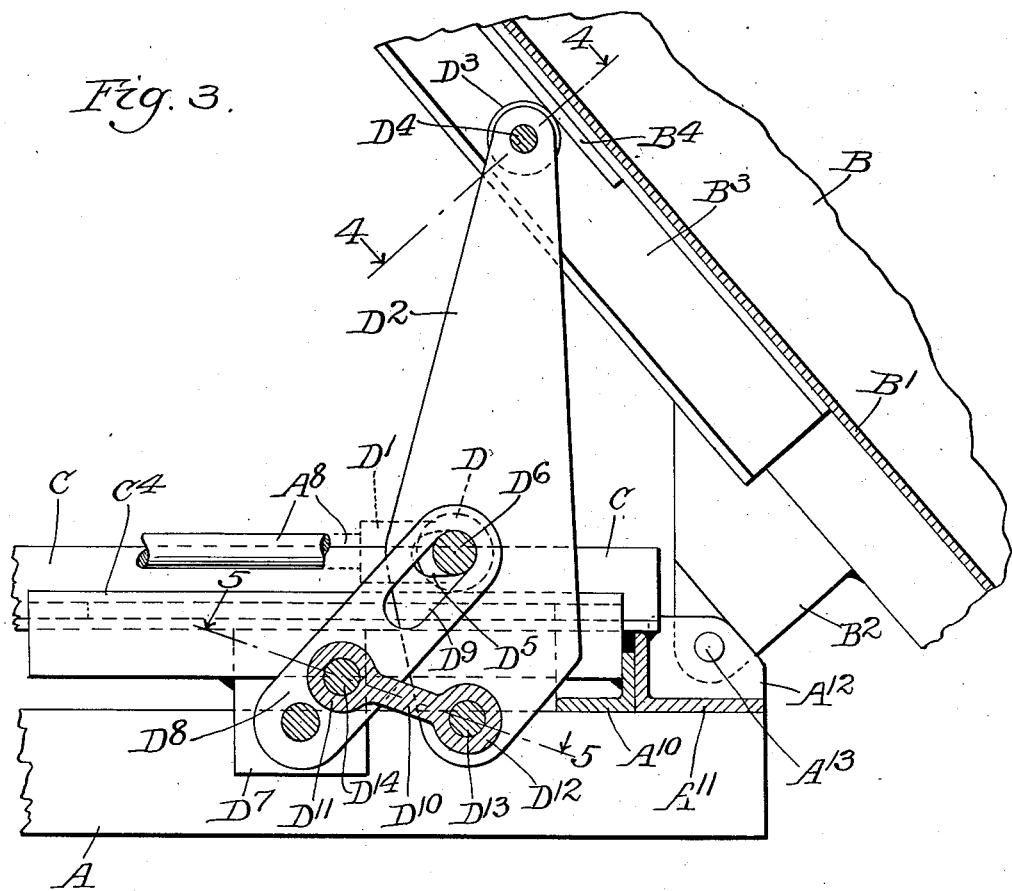
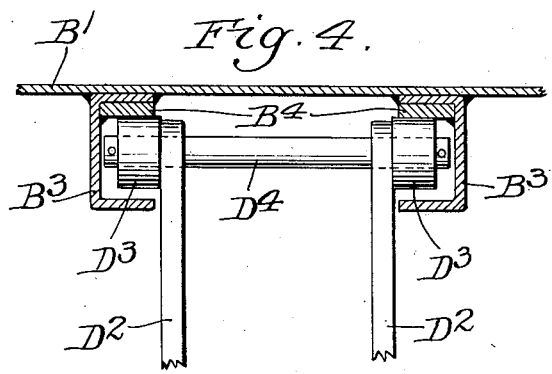
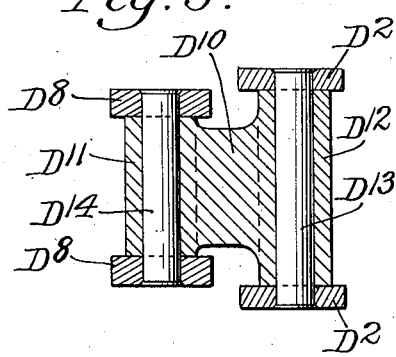

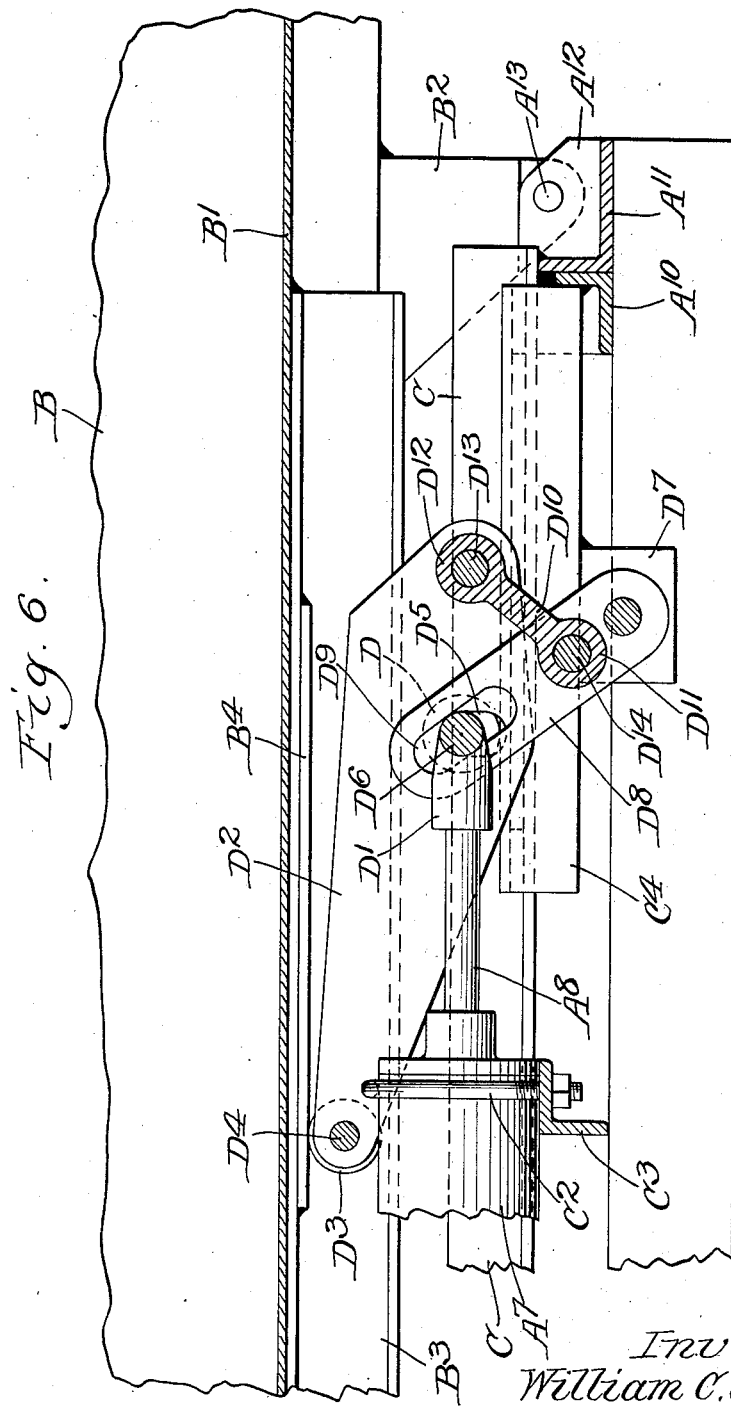

Patented May 2, 1933

1,906,302

UNITED STATES PATENT OFFICE

WILLIAM C. ANTHONY, OF STREATOR, ILLINOIS, ASSIGNOR TO ANTHONY COMPANY, A CORPORATION OF ILLINOIS

DUMPING BODY

Application filed March 17, 1931. Serial No. 523,308.

This invention relates to a dumping body and particularly to a mechanism for dumping a receptacle which is movably mounted on an automotive vehicle. One object of the invention is to provide in connection with such a vehicle mechanical means for dumping the receptacle and for providing means which makes certain the complete discharge of contents of the receptacle. Other objects will appear from time to time in the course of the specification and claims.

My invention is illustrated more or less diagrammatically in the accompanying drawings, wherein—

Figure 3 is a transverse vertical sectional detail on an enlarged scale showing the dumping mechanism raised;

Figure 4 is a transverse cross sectional view taken with line 4—4 of Figure 3;

Figure 5 is a sectional detail of one of the links which forms a part of the dumping mechanism, taken on line 5—5 of Figure 3; and Fig. 6 is a transverse vertical sectional detail on an enlarged scale, showing the dumping mechanism lowered.

Like parts are designated by like characters throughout.

A indicates the frame of an automotive vehicle having an axle $A^1$, wheels $A^2$, a driver's seat $A^3$, a power take-off $A^4$, a power transmission $A^5$, a hydraulic pumping assembly $A^6$, including a cylinder $A^7$ within which a piston is mounted for movement, to which piston is attached a rod $A^8$. $A^9$ is a cross frame member forming a part of the vehicle frame and situated intermediate the ends of the side frame members. $A^{10}$ is a rear cross frame member situated adjacent the end of the side frame members. $A^{11}$ is an additional rear cross frame member. It has fixed upon it a pair of bearing supports $A^{12}$ within which bearing members $A^{13}$ are positioned.

B is a dumping receptacle which may be of any suitable design. It is provided with a bottom $B^1$ and has projecting downwardly from it adjacent its rear end a pair of brackets $B^2$ which are supported upon the bearing members $A^{13}$ so that the body itself may be raised and lowered for example from the position shown in full lines in Figure 1 to that shown in dotted lines in Figure 1.

The body receptacle is provided with suitable frame members for strengthening purposes and may also be provided with a pair of inwardly facing channel or track members $B^3 B^3$. These members are positioned as shown preferably on the bottom of the body and they may be provided with reinforcing track or wearing strips $B^4 B^4$. Any suitable sort of gate mechanism may be used in connection with the body.

Figure 1:
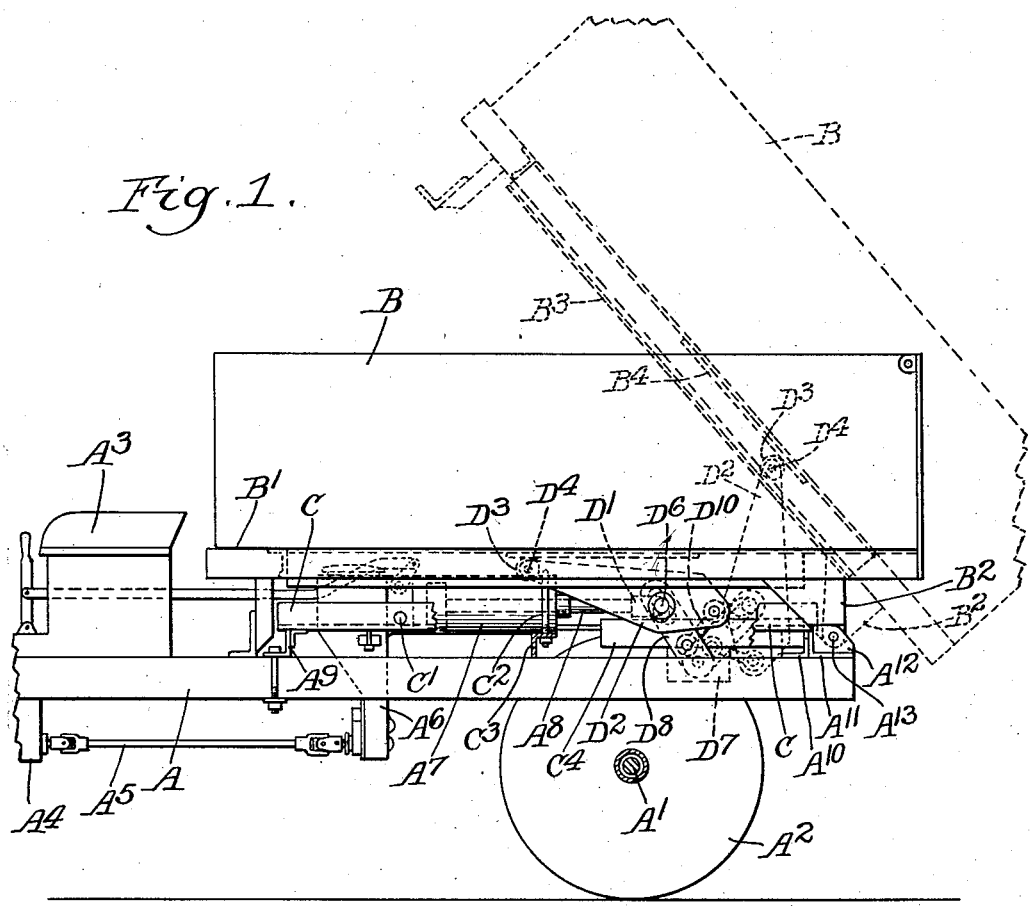
Figure 1 is a side elevation of a portion of the vehicle with parts broken away and parts in section.
Figure 2:
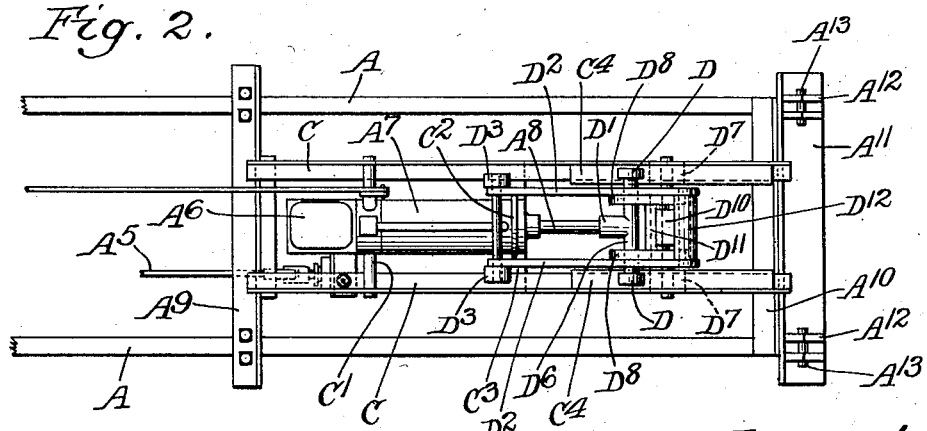
Figure 2 is a plan view of the vehicle and dumping mechanism with the body or receptacle removed.

C C are frame members preferably parallel to each other positioned intermediate the side frame members A and having their ends resting upon and secured to the cross frame members $A^9$ and $A^{10}$. The members C serve to support a portion of the hydraulic mechanism and the hydraulic cylinder as indicated in Figures 1 and 2, the pumping unit being provided with a cross member $C^1$ which rests upon and is engaged by the frame members C C, as indicated particularly in Figure 2, and the forward end of the cylinder being engaged by a U-bolt $C^2$ which is secured to a cross member $C^3$ which itself is fastened to the longitudinal sub-frame members C C. $C^4 C^4$ are track members mounted upon the longitudinal sub-frame members C C and serving as tracks to guide and support the rollers D D which are mounted for rotation upon a cross member $D^1$ which is itself fastened to and propelled by the piston rod $A^8$. $D^2 D^2$ are levers each provided at its upper end with a roller $D^3$ which runs within the channel shaped track $B^3$. A single shaft $D^4$ may extend across between the levers $D^2 D^2$ and may carry preferably at its outer ends the rollers $D^3$. The levers $D^2 D^2$ are provided with slots $D^5$ by means of which they are shiftably pivoted upon the shaft $D^6$ of the cross head $D^1$. $D^7$ $D^7$ are supports one positioned on each of the frame members C and each having pivotally mounted upon it a lever $D^8$ which is provided in its upper end with a slot $D^9$ which engages the shaft $D^6$ of the cross head $D^1$. A second link $D^{10}$ is provided with a cylindrical enlargement $D^{11}$ and a second cylindrical enlargement $D^{12}$ preferably somewhat longer than the enlargement $D^{11}$. This link is positioned between the levers $D^2$ $D^2$ and is pivotally connected to them by the pin $D^{13}$. It is also positioned between the two levers $D^8$ $D^8$ and is pivotally connected to those links by a pin $D^{14}$.

The use and operation of my invention are as follows:

The body will ordinarily be in the position shown in full lines in Figure 1. In that position it may be loaded and it will remain in that position ordinarily until it is to be dumped. During the period when dumping is not going on, the hydraulic pumping mechanism is normally not in motion. The details of the hydraulic pumping mechanism and of the cylinder have not been described in full, as they form no essential part of the present invention. It is sufficient that means are provided for swinging the levers $D^2$ upwardly.

With the body in the loading or full line position of Figure 1, the levers $D^2$ are in a substantially horizontal position, the shaft $D^6$ lies in the upper end of the slot $D^5$ in the lever $D^2$ and also lies at or near the lower end of the slot $D^9$ of the lever $D^8$. As the piston moves outwardly, or to the right as shown in Figures 1, 2 and 3, the levers $D^2$ pivot upwardly toward the position shown in dotted lines in Figure 1 and in full lines in Figure 3. The movement of the lever $D^2$ is controlled by the lever $D^2$ $D^8$ and link $D^{10}$ which cause the short end of the lever to pivot downwardly. During this pivoting movement, the shaft $D^6$ moves within the slots $D^9$ in the levers $D^8$ and at the completion of the dumping movement, this shaft lies in the outer or upper end of the slots $D^9$. The position shown in Figure 3 is that which the parts take when the piston has moved the full outward excursion. Ordinarily the parts have sufficient momentum to cause the body to tip slightly beyond this position. Sometimes this tipping will be caused by the weight of the body and load. When this occurs, the rollers $D^3$ will contact the lower flange of the channel tracks $B^3$ and the levers $D^2$ will then be moved to the right from the position shown in Figure 3, and thus the shaft $D^6$ comes in contact with the opposite ends of the slots $D^5$ in the lever $D^2$. The effect of this is to cause a "snapping" or jerking action of the body at the end of the dump, which tends to assist in discharging sticky material which may have adhered to the body. This snapping or jerking action can be repeated by the operator at will. He can operate the piston to move it back and forth slightly toward the outer limit of its excursion and thus he can repeat the snapping or jerking action as often as is necessary to free the load from the body. Without any particular manipulation on the part of the operator, however, the snapping and jerking action will ordinarily occur at least once as the body approaches the upper limit of its dumping position. When the body has reached the upper limit of the dumping position, it will be held there until the material has discharged completely and if the material is of such nature that it flows freely and discharges rapidly, it may not be necessary to hold the body at all in the dumping position. In any event, either automatically or by manual control, the body is returned to the loading position whenever it is desirable to do so. During the returning movement, the piston moves inward or to the left as shown in Figures 1, 2 and 3, and the cross head is, of course, moved with it and the parts are returned to the position shown in full lines in Figure 1.

Any sort of latching mechanism may be used for holding the body in the loading position and for some purposes no latching mechanism is needed. Any form of control of the hydraulic mechanism may be used. These details form no particular part of the present invention.

I claim:

1. In combination in a dumping assembly, a body pivotally mounted, means for moving said body, said means including a power source, a cross head actuated thereby, a lever, pivoted upon said cross head, engaging said body at one end, a second lever pivoted on a fixed support at one end and at its other end pivoted on said cross head, and a link pivoted at one end upon said second lever and at its other end pivoted on the other end of said first lever.

2. In combination in a dumping assembly, a body pivotally mounted, means for moving said body, said means including a power source, a cross head actuated thereby, a lever, pivoted upon said cross head, engaging said body at one end, a second lever pivoted on a fixed support at one end and at its other end pivoted on said cross head, and a link pivoted at one end upon said second lever, intermediate the ends of the latter, and at its other end pivoted on the other end of said first lever.

3. In combination in a dumping assembly, a frame, a body pivotally mounted thereon, means for moving said body with respect to said frame, said means including a power source, a cross head actuated thereby, a lever pivoted upon said cross head, engaging said body at one end, a second lever pivoted at one end and at its other end pivoted on said cross head, and a link pivoted at one end upon said second lever and at its other end pivoted on the other end of said first lever.

4. In combination in a dumping assembly, a body pivotally mounted, means for moving said body, said means including a power source, a cross head actuated thereby, a lever shiftably pivoted upon said cross head, engaging said body at one end, a second lever pivoted on a fixed support at one end and at its other end pivoted on said cross head, and a link pivoted at one end upon said second lever and at its other end pivoted on the other end of said first lever.

5. In combination in a dumping assembly, a body pivotally mounted, means for moving said body, said means including a power source, a cross head actuated thereby, a lever pivoted upon said cross head, engaging said body at one end, a second lever pivoted on a fixed support at one end and at its other end slidably pivoted on said cross head, and a link pivoted at one end upon said second lever and at its other end pivoted on the other end of said first lever.

6. In combination in a dumping assembly, a body pivotally mounted, means for moving said body, said means including a power source, a cross head actuated thereby, a lever shiftably pivoted upon said cross head, engaging said body at one end, a second lever pivoted on a fixed support at one end and at its other end slidably pivoted on said cross head, and a link pivoted at one end upon said second lever, and at its other end pivoted on the other end of said first lever.

7. In combination in a dumping assembly, a frame, a body pivotally mounted thereon, means for moving said body with respect to said frame, said means including a power source, a cross head actuated thereby, a lever shiftably pivoted upon said cross head, engaging said body at one end, a second lever pivoted on said frame at one end and at its other end pivoted on said cross head, and a link pivoted at one end upon said second lever, and at its other end pivoted on the other end of said first lever.

8. In combination in a dumping assembly, a frame, a body pivotally mounted thereon, means for moving said body with respect to said frame, said means including a power source, a cross head actuated thereby, a lever pivoted upon said cross head, engaging said body at one end, a second lever pivoted on said frame at one end and at its other end slidably pivoted on said cross head, and a link pivoted at one end upon said second lever, and at its other end pivoted on the other end of said first lever.

9. In combination in a dumping assembly, a frame, a body pivotally mounted thereon, means for moving said body with respect to said frame, said means including a power source, a cross head actuated thereby, a lever shiftably pivoted upon said cross head, engaging said body at one end, a second lever pivoted on said frame at one end and at its other end slidably pivoted on said cross head, and a link pivoted at one end upon said second lever, and at its other end pivoted on the other end of said first lever.

10. In combination in a dumping assembly, a body pivotally mounted, means for moving said body, said means including a power source, a cross head actuated thereby, a lever shiftably pivoted upon said cross head, engaging said body at one end, a second lever pivoted on a fixed support at one end and at its other end slidably pivoted on said cross head, and a link pivoted at one end upon said second lever, intermediate the ends of the latter, and at its other end pivoted on the other end of said first lever.

11. In combination in a dumping assembly, a frame, a body pivotally mounted thereon, means for moving said body with respect to said frame, said means including a power source, a cross head actuated thereby a lever shiftably pivoted upon said cross head, engaging said body at one end, a second lever pivoted on said frame at one end and at its other end slidably pivoted on said cross head, and a link pivoted at one end upon said second lever, intermediate the ends of the latter, and at its other end pivoted on the other end of said first lever.

12. In combination in a dumping body, a body mounted for pivotal movement, means for dumping the body including a power source, a member moved positively thereby, a lever shiftably moved upon said member, said lever at one end contacting the body, a second lever movably mounted at one end upon a fixed support and at the other end pivoted upon said member, a link pivoted upon the first lever at the end thereof opposite to the end which contacts the body.

13. In combination in a dumping body, a body mounted for pivotal movement, means for dumping the body including a power source, a member moved positively thereby, a lever shiftably moved upon said member, said lever at one end contacting the body, a second lever movably mounted at one end upon a fixed support and at the other end pivoted upon said member, a link pivoted upon the first lever at the end thereof opposite to the end which contacts the body, said lever slotted to provide shifting pivotal connections upon said member.

14. In combination in a dumping body, a body mounted for pivotal movement, means for dumping the body including a power source, a member moved positively thereby, a lever shiftably moved upon said member, said lever at one end contacting the body, a second lever movably mounted at one end upon a fixed support and at the other end pivoted upon said member, a link pivoted upon the first lever at the end thereof opposite to the end which contacts the body, said second mentioned lever slotted to provide shifting pivotal connections upon said member.

15. In combination in a dumping body, a body mounted for pivotal movement, means for dumping the body including a power source, a member moved positively thereby, a lever shiftably moved upon said member, said lever at one end contacting the body, a second lever movably mounted at one end upon a fixed support and at the other end pivoted upon said member, a link pivoted upon the first lever at the end thereof opposite to the end which contacts the body, said first lever and said second lever slotted to provide shifting pivotal connections upon said member.

16. In combination in a dumping body, a frame therefor, a body mounted thereon for pivotal movement with respect thereto, means for dumping the body including a power source, a member moved positively thereby, a lever shiftably pivoted upon said member, said lever at one end contacting the body, a second lever pivoted at one end upon the frame and at the other end pivoted upon said member, a link pivoted upon said second lever, and pivoted upon the first lever at the end thereof opposite to the end which contacts the body.

17. In combination in a dumping body, a frame therefor, a body mounted thereon for pivotal movement with respect thereto, means for dumping the body including a power source, a member moved positively thereby, a lever shiftably pivoted upon said member, said lever at one end contacting the body, a second lever pivoted at one end upon the frame and at the other end shiftably pivoted upon said member, a link pivoted upon said second lever, intermediate its ends, and pivoted upon the first lever at the end thereof opposite to the end which contacts the body.

18. In combination in a dumping body, a frame therefor, a body mounted thereon for pivotal movement with respect thereto, means for dumping the body including a power source, a member moved positively thereby, a lever shiftably pivoted upon said member, said lever at one end contacting the body, a second lever pivoted at one end upon the frame and at the other end shiftably pivoted upon said member, a link pivoted upon said second lever, intermediate its ends, and pivoted upon the lever at the end thereof opposite to the end which contacts the body, said first lever and said second mentioned lever slotted to provide shifting pivotal connections upon said member.

19. In combination in a dumping body, a supporting frame, a body supported thereon for tilting movement, a lever swingingly mounted, means for swinging said lever to tilt the body, a shifting mounting for said lever, intermediate its ends, and a connecting linkage of variable length joining one end of said lever to a fixed support on said frame, said linkage including a member provided with a shifting pivotal point of support.

20. In combination in a dumping body, a supporting frame, a body mounted for pivotal tilting movement, a lever swingingly mounted, means for swinging said lever to tilt the body, a shifting pivotal mounting for said lever, intermediate its ends, and a connecting linkage of variable length joining one end of said lever to a fixed support on said frame, said linkage including a member provided with a shifting point of support.

Signed at Streator, county of La Salle and State of Illinois, this 11th day of March 1931.

WILLIAM C. ANTHONY.